(12) United States Patent
Sampsell

(10) Patent No.: US 6,614,988 B1
(45) Date of Patent: Sep. 2, 2003

(54) NATURAL LANGUAGE LABELING OF VIDEO USING MULTIPLE WORDS

(75) Inventor: Jeffrey Brian Sampsell, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 0 days.

(21) Appl. No.: 08/825,140

(22) Filed: Mar. 28, 1997

(51) Int. Cl.[7] .................................................. H04N 5/91
(52) U.S. Cl. ......................... 386/95; 386/117; 348/239
(58) Field of Search ........................ 386/95, 102, 117; 348/207, 232, 239, 231.5; 358/906; H04N 5/91

(56) References Cited

U.S. PATENT DOCUMENTS

| | | | | |
|---|---|---|---|---|
| 4,482,924 A | | 11/1984 | Brownstein | 358/302 |
| 4,641,203 A | * | 2/1987 | Miller | 358/335 |
| 4,714,962 A | | 12/1987 | Levine | 358/209 |
| 4,908,713 A | * | 3/1990 | Levine | 358/335 |
| 4,999,709 A | * | 3/1991 | Yamazaki et al. | 358/160 |
| 5,448,371 A | * | 9/1995 | Choi | 358/335 |
| 5,515,101 A | * | 5/1996 | Yoshida | 348/239 |
| 5,555,408 A | * | 9/1996 | Fujisawa et al. | 395/600 |
| 5,613,032 A | * | 3/1997 | Cruz et al. | 386/69 |
| 5,870,701 A | * | 2/1999 | Wachtel | 704/9 |

* cited by examiner

Primary Examiner—Vincent Boccio
(74) Attorney, Agent, or Firm—Chernorr Vilhauer McClung & Stenzel, LLP

(57) ABSTRACT

A system for labeling video or photographic images on a portable handheld device, such as a camcorder or camera, includes a language interface. The user is prompted through the language interface with a first plurality of first words, each of the first words including a plurality of letters, from which the user selects at least one of the first words. The user is then prompted through the interface with a second plurality of second words, each of the second words including a plurality of letters, from which the user selects at least one of the second words. The selected at least one of the first words and the selected at least one of the second words are combined to create a label relating to subject matter obtained by the portable handheld device. The label is overlaid on or attached to the video clips (digital and analog) or photographic images (digital and film based) depending on the nature of the portable handheld device.

21 Claims, 3 Drawing Sheets

NATURAL LANGUAGE LABELING OF VIDEO USING MULTIPLE WORDS

BACKGROUND OF THE INVENTION

The present invention relates to a natural language labeling system for video and photographic images.

Video recorders, and in particular handheld portable camcorders, typically include buttons that permit the user to enter a text label which is overlaid on a small portion of the video images on a tape as the video images are obtained. To enter the desired text, the user scrolls through the alphabet in a letter-by-letter process until the desired letter appears. When the desired letter appears it may be selected so that it becomes a part of the text label. This letter by letter process is repeated until the desired text label is completely entered. Unfortunately, this process is time consuming and therefore infrequently done by users. Because camcorders are small so as to be handheld, they are not suitable for an additional alpha-numeric keypad from which to enter text. However, it is desirable to label individual video clips to assist a user's recollection of the taped event. Also, over time the user may accumulate hundreds of video tapes, with each video tape including hundreds of different video clips. Without accurately labeling the exterior label of a video tape with an indication of all the video clips contained therein, locating the desired video clip among many tapes becomes a nightmarish task. This task is even more difficult for somebody who has not previously viewed the video clip or the video tape.

Photographic items such as photos, slides, and digital image files have other problems. For example, individuals may take hundres to thousands of photographic pictures (prints or transparencies) every year. Ideally every good picture is stored in a photo album together with its negative, or a slide tray or cassette in the case of transparencies. However, organizing photos in a photo album requires considerable effort and most often individuals merely look at the pictures once or twice and then place them in a box with other pictures. Over time negatives tend to become separated from their respective pictures making it difficult to obtain a duplicate print of a desired picture because the negative cannot be located. In addition, if each picture is not manually labeled with a label relating to its subject, then over time the photographer may not be able to recall the subject matter of the picture, the people shown in the picture, and the date that the picture was taken. There are similar problems relating to locating and identifying slides.

Several film developing services now scan negatives (or positives) to create a digital photographic image file of each picture. The digital photographic image file is then provided to the customer either on storage media such as a diskette or over a network such as the internet. Similar labeling, identification, locating, and storing problems exist with digital photographic image files, as with traditional photographic pictures and slides.

Fujisawa et al. U.S. Pat. No. 5,555,408 disclose a knowledge based information retrieval system suitable to query existing databases for desired information. The natural language portion of the retrieval system permits users to enter an English sentence query, as opposed to cryptic database syntax query, to search for desired information within the database. The natural language interface is intuitive for the user and alleviates the need for the user to learn the cryptic database query syntax, thus making the system faster to learn. Such systems are generally referred to as natural language query systems.

What is desired, therefore, is a system for efficiently labeling video and photographic images that is suitable for portable handheld devices. Also, the system should permit the efficient categorization and retrieval of video clips and photographic images.

SUMMARY OF THE PRESENT INVENTION

The present invention overcomes the aforementioned drawbacks of the prior art by providing a system for labeling video or photographic images on a portable handheld device, such as a camcorder or camera, that includes a language interface. The user is prompted through the language interface with a first plurality of first words, each of the first words including a plurality of letters, from which the user selects at least one of the first words. The user is then prompted through the interface with a second plurality of second words, each of the second words including a plurality of letters, from which the user selects at least one of the second words. The selected at least one of the first words and the selected at least one of the second words are combined to create a label relating to subject matter obtained by the portable handheld device. The label is either overlaid on or attached to the video clips (digital and analog) or photographic images (digital and film based) depending on the nature of the portable handheld device and the system configuration. Preferably, the system includes search tools that use the language interface to locate video clips (digital and analog) or photographic images (digital and film based).

The language interface permits the user to create a label using a word-by-word process so that the video clips and photographic images are easily identified later. In addition, the language interface permits the user to select entire words which allows for the quick creation of the label. Since labels are easier to create, it is more likely that the user will actually label his video and photographic images. Also, by labeling the video and photographic images, the user will be able to search for desired video or photographic images by using electronic search tools. Further, the language interface is especially suitable for portable handheld devices, such as cameras and camcorders, where space limitations exist that prohibit the use of an alpha-numeric keyboard. As such, the language interface only requires a few controls, such as buttons or touch-sensitive points on a display, to be used effectively.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
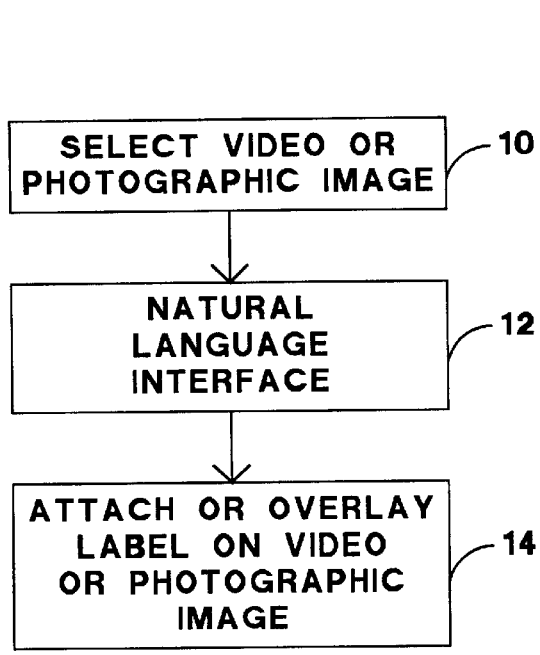
FIG. 1 is a block diagram of an exemplary embodiment of a natural language labeling system that includes a natural language interface of the present invention.

Referring to FIG. 1, the present inventor came to the realization that the text created using a natural language query system, which was previously designed for and specifically used to query existing databases for information, may be used in a new manner to label video and photographic images. First, the user selects the video or photographic image to label at block 10. Then, the user uses a natural language interface 12, described in detail below, to create a suitable label that relates to and describes the subject matter of the video or photographic image previously selected at block 10. Thereafter, the label created using the natural language interface 12 is attached to or overlaid on the selected video or photographic image 10, as described below. By connecting the selected video or photographic image with the label, the video or photographic image can later be located with electronic search tools and the subject matter of the video or photographic image will not be forgotten over time.

The natural language interface 12 permits the user to create a label using a word-by-word process for video or photographic images so that they are easily identified later. In addition, the natural language interface 12 permits the user to select entire words, as opposed to individual letters, which allows for the quick creation of the label. Since labels are easier to create, it is more likely that the user will actually label his video and photographic images. Also, by labeling the video and photographic images, the user will be able to search for desired video or photographic images by using electronic search tools that search for and compare the natural language query text with labels attached to or overlaid on the video or photographic images. Further, the natural language interface 12 is especially suitable for portable handheld devices, such as cameras and camcorders, where space limitations exist that prohibit the use of an alphanumeric keyboard. As such, the user can enter the label by selecting entire words presented to the user that are suitable for each location within a sentence. As such, the natural language interface 12 only requires a few controls, such as buttons or touch-sensitive points on a display, to be used effectively.

Figure 2:
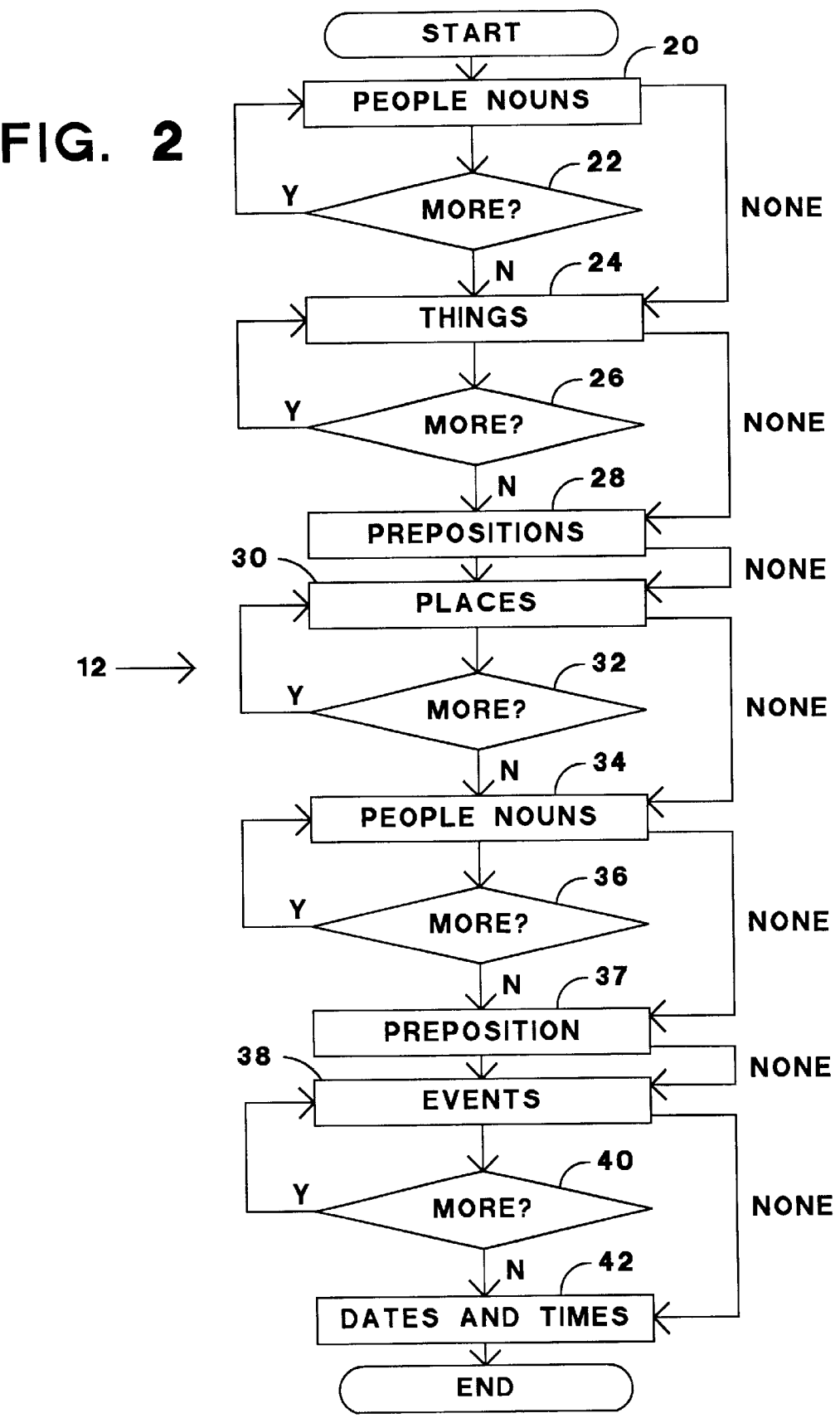
FIG. 2 is a block diagram of the natural language interface of the labeling system of FIG. 1.

Referring to FIG. 2, the natural language interface 12 allows the user to create the label by following a simple process of presenting different lists of words to the user. The user is first presented with a list of people nouns 20 from which to select the desired person, if any. The people nouns 20 may include, for example, mom, dad, sister, brother, grandma, grandpa, son, daughter, friend, family, soccer club, Tom, Smith, Jeffrey, Susan, and Kevin. Additional people nouns 20 may be added to the list by entering them into the natural language interface 12 by a manual letter-by-letter process, downloaded to the natural language interface 12 through a communication channel, PCMCIA card connected to the natural language interface 12, or any other suitable method. After selecting the first people noun 20 the user has the option at block 22 to select additional people nouns 20.

Next, the user is presented with a list of things 24, such as, for example, car, truck, tree, shoe, computer, desk, ice ax, and ball, from which to select appropriate things 24, if any. After selection of one of the things 24, if any, the user has the option at block 26 to select additional things 24.

Next, the user is presented with a list of prepositions 28 to select from, such as, for example, and, on, from, at, and of.

Next, the user is presented with a list of places 30, such as, for example, beach, town, mountain, home, work Portland, and Vancouver, from which to select appropriate places 30, if any. After selection of one of the places 30, if any, the user has the option at block 32 to select additional places 30.

Next, the user is again presented with a list of people nouns 34, such as, for example, mom, dad, sister, brother, grandma, grandpa, son, daughter, friend, Jon, Tom, Smith, Jeffrey, Susan, and Kevin, from which to select appropriate people nouns 34, if any. After selection of one of the people nouns 34, if any, the user has the option at block 36 to select additional people nouns 34.

Next, the user is again presented with a list of prepositions 37 from which to select one.

Next, the user is presented with a list of events 38, such as, for example, birthday, wedding, party, Christmas, marathon, and vacation, from which to select appropriate events 38, if any. After selection of one of the events 38, the user has the option at block 40 to select additional events 38, if any.

Next, the user is presented with a list of dates and times 42, such as, for example, Monday, Tuesday, Wednesday, Thursday, Friday, Saturday, Sunday, January, February, morning, afternoon, evening, and time, from which to select appropriate dates and times 42, if any. The video or camera device normally includes an internal clock so the selection of "time" actually provides the current time.

The natural language interface 12 permits the user to create a label that relates to and identifies the subject matter of the video or photographic image. The particular order of different categories of words and the particular order of words within each category may be modified by the user to accommodate trends in use. Further, the words within each category may be changed, as desired, by any suitable manner such as by manual entry, downloading through a communication channel, and PCMCIA cards. Additionally, other suitable categories of words may likewise be added. The user's selection of any particular individual word within each category may change the words that the natural language interface 12 presents to the user within later selections. This allows the natural language interface 12 to present words to the user that are more likely to accurately describe the video or photographic image. For example, if the thing 24 selected by the user was a beach ball then the list of places 30 may be modified to include words related to beaches and oceans. This helps maintain relatively short lists of words presented to the user which decreases the time required to create a label. In addition, the user should be able to skip particular categories, if desired. Also, the user should be able to vary the order in which the selections are presented to create a label with a different structure. For example, people nouns may be switched with things. Further, suitable prepositions, pronouns (which, who, that), indefinite articles (a, an), and definite articles (the) may be automatically added by the interface 12 in appropriate locations to create a more grammatically correct label.

Figure 3:
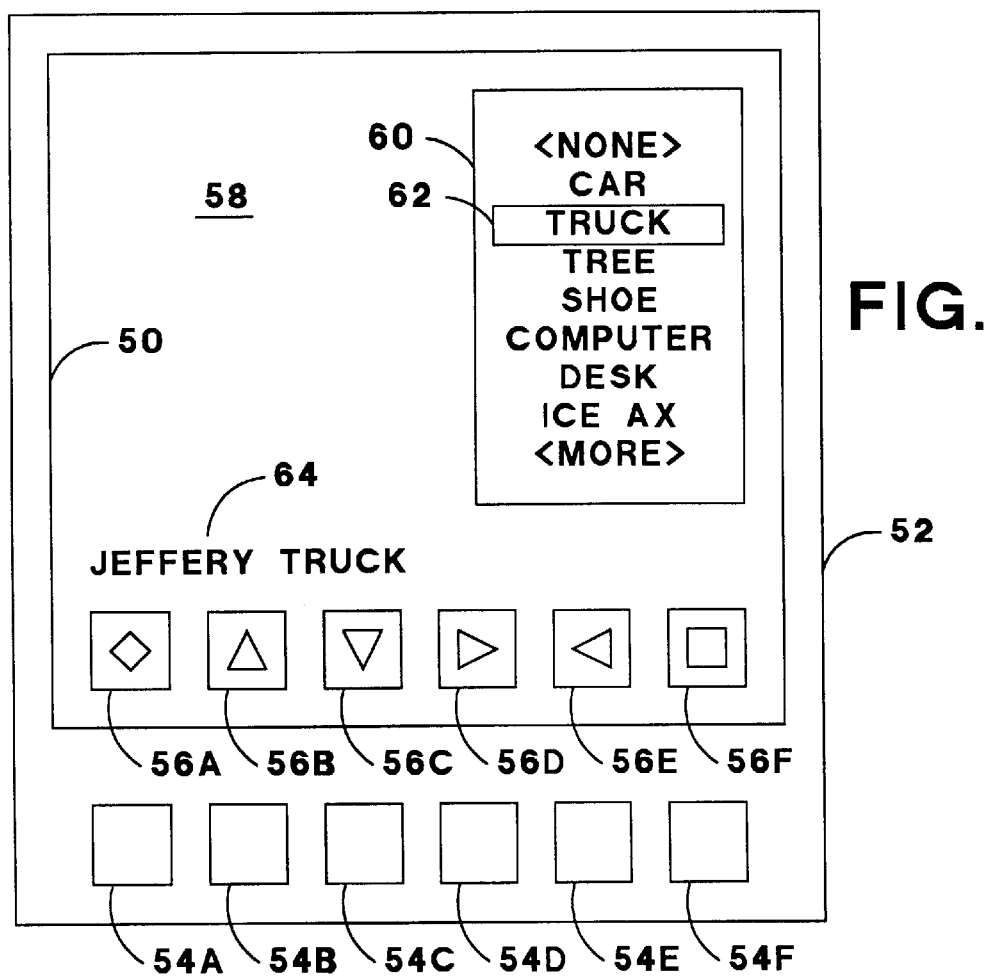
FIG. 3 is a schematic view of a camcorder and a viewfinder including the natural language interface of FIG. 2.

Referring to FIG. 3, a camcorder 52, and in particular a camcorder viewfinder 50, may be used in conjunction with the natural language interface 12 to create a label. The camcorder 52 may include a set of buttons 54a–54f each of which corresponds to respective virtual buttons 56a–56f displayed on the display 58 within the viewfinder 50. A list of selections may be displayed on the display 58 in a box 60. By using the up button 54b and the down button 54c the user may scroll through the available selections to select the desired word, as indicated with the highlight bar 62. The select button 54a is used to select the highlighted word and add it to the label 64 being created, as shown in the lower portion of the display 58. Any necessary prepositions, pronouns, indefinite articles, and definite articles may be automatically added, as needed. To proceed to the next set of words the "none" selection is highlighted and selected. Alternatively, the forward button 54d can be used to proceed to the next set of words. The back button 54e can be used to return to and modify items already selected. After the desired label 64 is created, the stop button 54f is selected to exit the natural language interface 12. The system then records the label at an appropriate location on the video, such as on the lower portion of each video. The label can be selected to appear for a limited number of frames, a single frame, or continuously. The virtual keys 56a–56f may be redefined, as desired, to provide additional functions.

Labeling only one or a limited number of frames of the video reduces the time that the label obscures the video image during playback. However, the label may still be searched for by a video search interface to locate the particular video clips associated with the label, as described later. One system suitable to attach or encode text on video is described in Eisen et al. U.S. Pat. No. 5,440,678 incorporated herein by reference.

Figure 4:
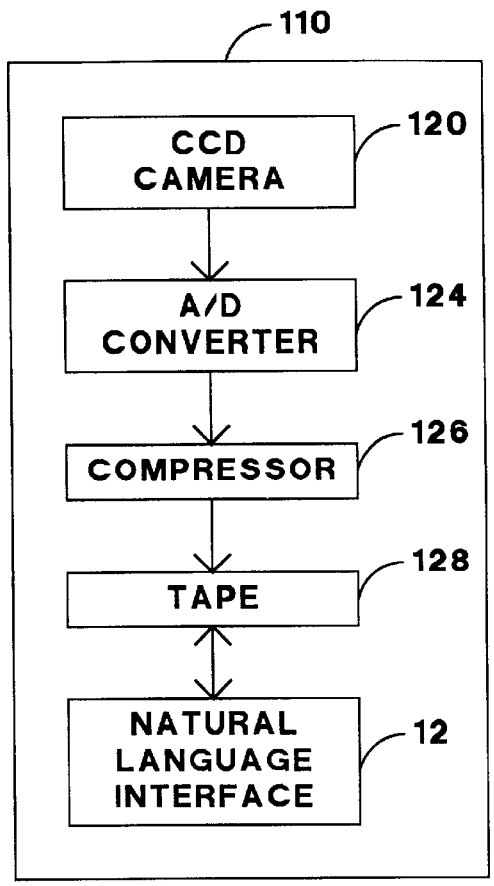
FIG. 4 is a schematic view of a digital camcorder including the natural language interface of FIG. 2.

Referring to FIG. 4, a digital camcorder 110 includes a CCD camera 120 that senses the scene in the view of the camera. An analog-to-digital (A/D) converter 124 converts the analog output of the CCD camera 120 to a digital signal. A compressor 126 compresses the digital output from the A/D converter 124 in a manner similar to MPEG-2. The compressed digital data is then stored on the video portion of a tape 128 at 20 Mbits/sec. The tape 128 also includes a digital data track that is used to store additional information thereon. Similar to the analog-based camcorder described in relation to FIG. 3, the digital camcorder may include the natural language interface 12 and store the label either in the video portion or on the data track of the tape 128.

Figure 5:
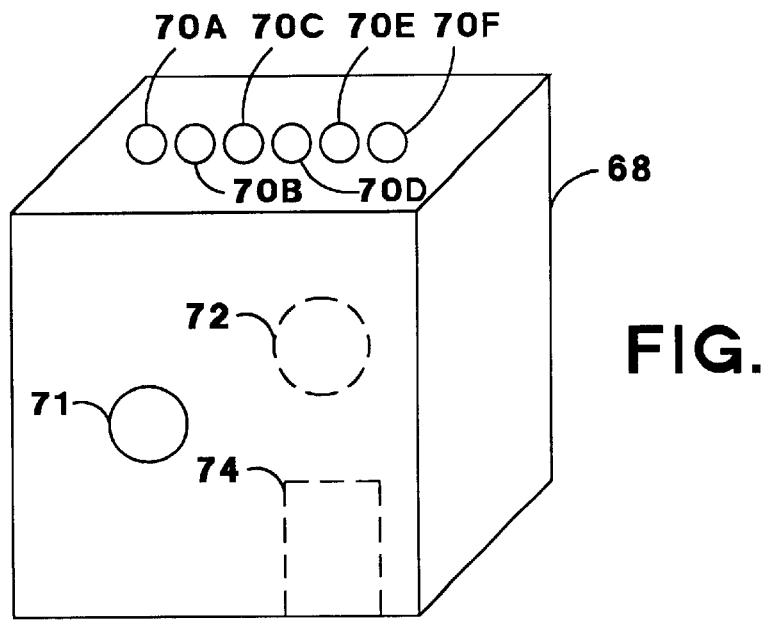
FIG. 5 is a simplified pictorial view of a camera including the natural language interface of FIG. 2.

Referring to FIG. 5, a digital camera 68 preferably includes a lens 71, a viewfinder (not shown), and a set of buttons 70a–70f that may have the same functions as the buttons 54a–54f and 56a–56f previously described in relation to the camcorder 52 of FIG. 3. The words for the label are viewed and selected by use of the viewfinder and buttons 70a–70j, similar to that of the camcorder 52. The digital camera 68 may include a minidisc 72, built-in memory, or memory card 74 upon which captured images are stored. The natural language labels are preferably overlaid on the digital image obtained by the camera 68. Alternatively, the natural language labels may be electronically attached to one (or more) digital photographic image file without actually altering the image. As such, the label is associated with the file but this image file is not altered.

Figure 6:
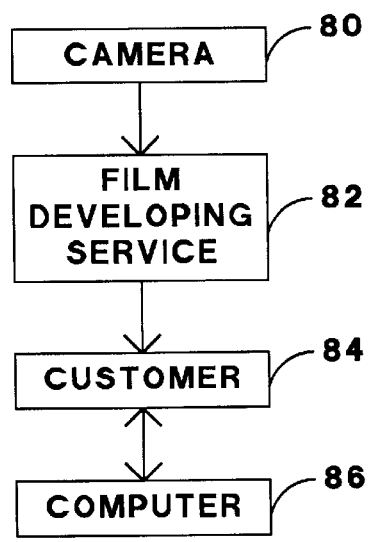
FIG. 6 is a block diagram of a natural language labeling system suitable for use with film developing services.

Referring to FIG. 6, a traditional film camera 80 may be used together with the natural language interface 12. The film from the camera 80 is sent to a film developing service 82 that develops the negative (or positive) and scans each image on the film to obtain digital photographic image files. The digital photographic image files are electronically transferred to the customer 84 through a computer network such as the internet. Alternatively, the digital photographic image files may be recorded onto storage media, such as floppy discs, and mailed to the customer 84. The customer 84 uses a personal computer 86 that includes software with the natural language interface 12 to label each of the digital photographic image files. The labels may be overlaid on the image or attached to the image file without modifying the actual image.

An Advanced Photo System (APS) camera uses a film that includes a generally transparent thin layer of magnetic material over either a portion of or all of the film. The magnetic material is suitable to encode digital information therein. Traditionally, the magnetic material records conditions that exist when the respective photo was taken, such as lighting and camera settings, that are used to improve the quality of subsequent film developing. The camera may include the natural language interface 12 with the label stored in a digital format in the magnetic material.

The natural language interface 12 also includes a search query function. The user builds a query of words, in a manner similar to creating a label as previously described, that the user wants to locate in previously completed labels using the natural language interface 12. The system then searches through all video (digital or analog) and photographic images (digital or film based) to locate video clips or photographs that contain one or more of the keywords. In the case where the labels are recorded on the video or photographic image this may involve the analysis of the content of the image(s) itself.

It is to be understood that many electronic devices, and particularly camcorders, may include larger displays for viewing the images. The natural language interface 12 is suitable for use with any type of selection device, such as, for example, a touch-sensitive overlay on the display, a light pen, a mouse, a joystick, a plurality of buttons, and a pointer stick.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of labeling video comprising the steps of:
   (a) providing a portable handheld device for recording a video onto a tape that includes a language interface;
   (b) prompting a user through said language interface with a first plurality of first words, each of said first words including a plurality of letters and each of said first words individually selectable by said user, from which said user selects at least one of said first words;
   (c) prompting said user through said interface with a second plurality of second words, each of said second words including a plurality of letters and each of said second words individually selectable by said user, from which said user selects at least one of said second words;
   (d) combining said selected at least one of said first words and said selected at least one of said second words within a single phrase to create a label relating to at least one of subject matter of a video clip recorded on said tape and of subject matter of a video clip to be recorded on said tape; and
   (e) recording said label on said tape by said portable handheld device such that said label is observable by said user while viewing said video clip.

2. The method of claim 1 wherein said portable handheld device is a camcorder.

3. The method of claim 1 wherein said first words and said second words include at least one identical word.

4. The method of claim 1 further comprising the steps of:
   (a) prompting said user through said language interface with a third plurality of third words, each of said third words including a plurality of letters and each of said third words individually selectable by said user, from which said user selects at least one of said third words;
   (b) prompting said user through said interface with a fourth plurality of fourth words, each of said fourth words including a plurality of letters and each of said fourth words individually selectable by said user, from which said user selects at least one of said fourth words; and (c) searching said tapes by said portable handheld device to locate at least one said label previously recorded on said tape that matches at least one of said at least one of said third words and said at least one of said fourth words.

5. The method of claim 4 wherein said third words and said fourth words include at least one identical word.

6. The method of claim 1 wherein said recording of said label is on the video portion of said tape.

7. A method of labeling video comprising the steps of:
(a) providing a portable handheld device for recording a video onto a tape that includes a language interface;
(b) prompting a user through said language interface with a first plurality of first words, each of said first words including a plurality of letter and each of said first words individually selectable by said user, from which said user selects at least one of said first words;
(c) prompting said user through said interface with a second plurality of second words, each of said second words including a plurality of letters and each of said second words individually selectable by said user, from which said user selects at least one of said second words;
(d) combining said selected at least one of said first words and said selected at least one of said second words within a single phrase to create a label relating to at least one of subject matter of a video clip recorded on said tape and subject matter of a video clip to be recorded on said tape; and
(e) recording said label by said portable handheld device on a limited number of frames of said tape such that said label is not clearly noticeable to the human eye while viewing said video clip.

8. The method of claim 7 wherein said limited number of frames is one frame.

9. The method of claim 7 wherein said portable handheld device is a camcorder.

10. The method of claim 7 wherein said first words and said second words include at least one identical word.

11. The method of claim 7, further comprising the steps of:
(a) prompting said user through said language interface with a third plurality of third words, each of said third words including a plurality of letters and each of said third words individually selectable by said user, from which said user selects at least one of said third words;
(b) prompting said user through said interface with a fourth plurality of fourth words, each of said fourth words including a plurality of letters and each of said fourth words individually selectable by said user, from which said user selects at least one of said fourth words; and
(c) searching said tape by said portable handheld device to locate at least one said label previously recorded on said tape that matches at least one of said at least one of said third words and said at least one of said fourth words.

12. The method of claim 11 wherein said third words and said fourth words include at least one identical word.

13. A method of labeling video comprising the steps of:
(a) providing a portable handheld device for recording a video onto a tape in a digital format that includes a language interface;
(b) prompting a user through said language interface with a first plurality of first words, each of said first words including a plurality of letters and each of said first words individually selectable by said user, from which said user selects at least one of said second words;
(c) prompting said user through said interface with a second plurality of second words, each of said first words including a plurality of letters and each of said second words individually selectable by said user, from which said user selects at least one of said second words;
(d) combining said selected at least one of said first words and said selected at least one of said second words within a single phase to create a label relating to at least one of subject matter of a video clip recorded on said tape and subject matter of a video clip to be recorded on said tape; and
(e) recording said label on said tape in a digital format by said portable handheld device.

14. The method of claim 13 wherein said label is observable by said user while viewing said video clip.

15. The method of claim 13 wherein said label is not observable by said user while viewing said video clip.

16. The method of claim 13 wherein said label is recorded on a video portion of said tape.

17. The method of claim 13 wherein said label is recorded on a data track portion of said tape.

18. The method of claim 13 wherein said portable handheld device is a camcorder.

19. The method of claim 13 wherein said first words and said second words include at least one identical word.

20. The method of claim 13, further comprising steps of:
(a) prompting said user through said language interface with a third plurality of third words, each of said third words including a plurality of letters and each of said third words individually selectable by said user, from which said user selects at least one of said third words;
(b) prompting said user through said interface with a fourth plurality of fourth words, each of said fourth words including a plurality of letters and each of said fourth words individually selectable by said user, from which said user selects at least one of said fourth words; and
(c) searching said tape by said portable handheld device to locate at least one said label previously recorded on said tape that matches at least one of said at least one of said third words and said at least one of said fourth words.

21. The method of claim 20 wherein said third words and said fourth words include at least one identical word.

\* \* \* \* \*

UNITED STATES PATENT AND TRADEMARK OFFICE
CERTIFICATE OF CORRECTION

| | |
|---|---|
| PATENT NO. | : 6,614,988 B1 |
| APPLICATION NO. | : 08/825140 |
| DATED | : September 2, 2003 |
| INVENTOR(S) | : Jeffrey Brian Sampsell |

It is certified that error appears in the above-identified patent and that said Letters Patent is hereby corrected as shown below:

Column 3, line 63
Insert comma after "work"

Column 7, line 18
Change "letter" to --letters--

Column 8, line 22
Change "phase" to --phrase--

Signed and Sealed this

Twenty-fourth Day of October, 2006

JON W. DUDAS
*Director of the United States Patent and Trademark Office*